United States Patent
Luke

(10) Patent No.: US 8,905,695 B2
(45) Date of Patent: Dec. 9, 2014

(54) FASTENING ARRANGEMENT

(75) Inventor: Simon Luke, West Midlands (GB)

(73) Assignee: Capital Safety Group (Northern Europe) Limited (GB)

( * ) Notice: Subject to any disclaimer, the term of this patent is extended or adjusted under 35 U.S.C. 154(b) by 0 days.

(21) Appl. No.: 14/006,243

(22) PCT Filed: Mar. 12, 2012

(86) PCT No.: PCT/EP2012/054275
§ 371 (c)(1),
(2), (4) Date: Sep. 19, 2013

(87) PCT Pub. No.: WO2012/126762
PCT Pub. Date: Sep. 27, 2012

(65) Prior Publication Data
US 2014/0010617 A1    Jan. 9, 2014

(30) Foreign Application Priority Data
Mar. 24, 2011 (GB) .................................. 1104974.9

(51) Int. Cl.
*F16B 21/00* (2006.01)
*E04G 21/32* (2006.01)
*F16B 13/08* (2006.01)

(52) U.S. Cl.
CPC ........ *F16B 13/0808* (2013.01); *E04G 21/3276* (2013.01)
USPC .......................................... 411/340; 411/345

(58) Field of Classification Search
USPC .................... 411/44, 47, 80.1, 337, 338, 345
See application file for complete search history.

(56) References Cited

U.S. PATENT DOCUMENTS

| | | | | |
|---|---|---|---|---|
| 221,827 A * | 11/1879 | Johnston | ........................ | 217/106 |
| 2,771,259 A * | 11/1956 | Laystrom | ...................... | 248/489 |
| 2,871,749 A * | 2/1959 | Kalb | ............................. | 411/80.1 |
| 2,908,196 A * | 10/1959 | Apfelzweig | .................. | 411/344 |
| 3,021,927 A * | 2/1962 | McKee, Jr. | ...................... | 52/521 |
| 3,196,733 A * | 7/1965 | Cohen et al. | ..................... | 411/51 |
| 4,726,164 A * | 2/1988 | Reinwall et al. | ................ | 52/410 |
| 4,834,601 A * | 5/1989 | Schaap | ......................... | 411/340 |
| 4,997,327 A | 3/1991 | Cira | | |
| 6,203,260 B1 * | 3/2001 | Henline et al. | ................ | 411/340 |
| 2002/0100244 A1 | 8/2002 | Carroll | | |
| 2009/0169331 A1 | 7/2009 | Pilon | | |

FOREIGN PATENT DOCUMENTS

DE    202005011463 U1    9/2005
DE    102007039966 A1    5/2008

OTHER PUBLICATIONS

International Search Report issued in PCT/EP2012/054275, mailed May 31, 2012, 4 pages.

* cited by examiner

*Primary Examiner* — Roberta Delisle
(74) *Attorney, Agent, or Firm* — IPLM Group, P.A.

(57) ABSTRACT

A fastening arrangement includes a threaded fastener (5) including a head (11), a shank (9) and a laterally expandable member (17). A bridging member (7) is provided on the shank of the fastener, the bridging member having an aperture through which the shank passes. The aperture has a dimension greater than the dimension of the shank (9) but less than the dimension of the head (11), and an outer dimension greater than a dimension of the laterally expandable member (17) in a first configuration but less than the dimension of the laterally expandable member in a second configuration.

20 Claims, 2 Drawing Sheets

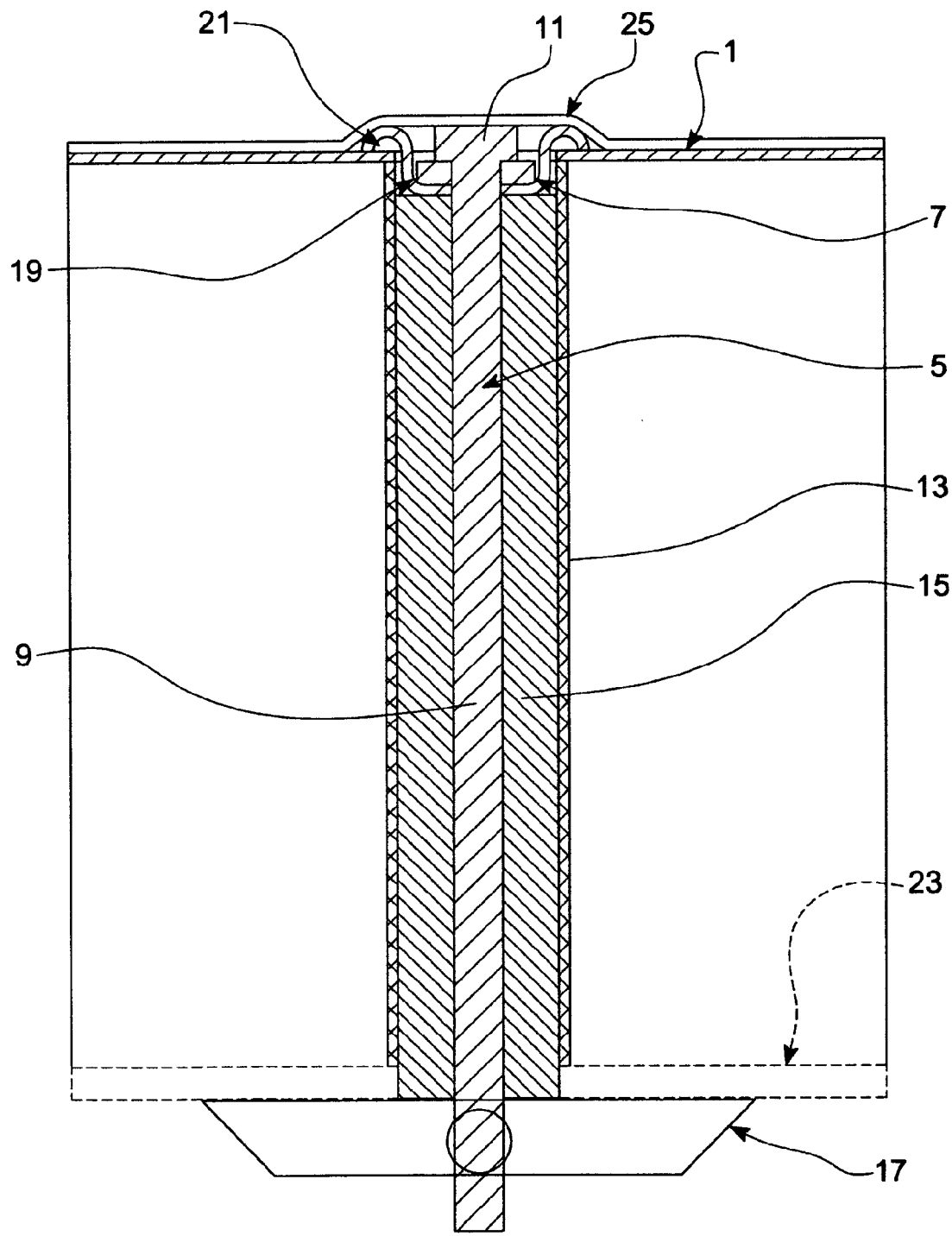

FASTENING ARRANGEMENT

Figure 1:
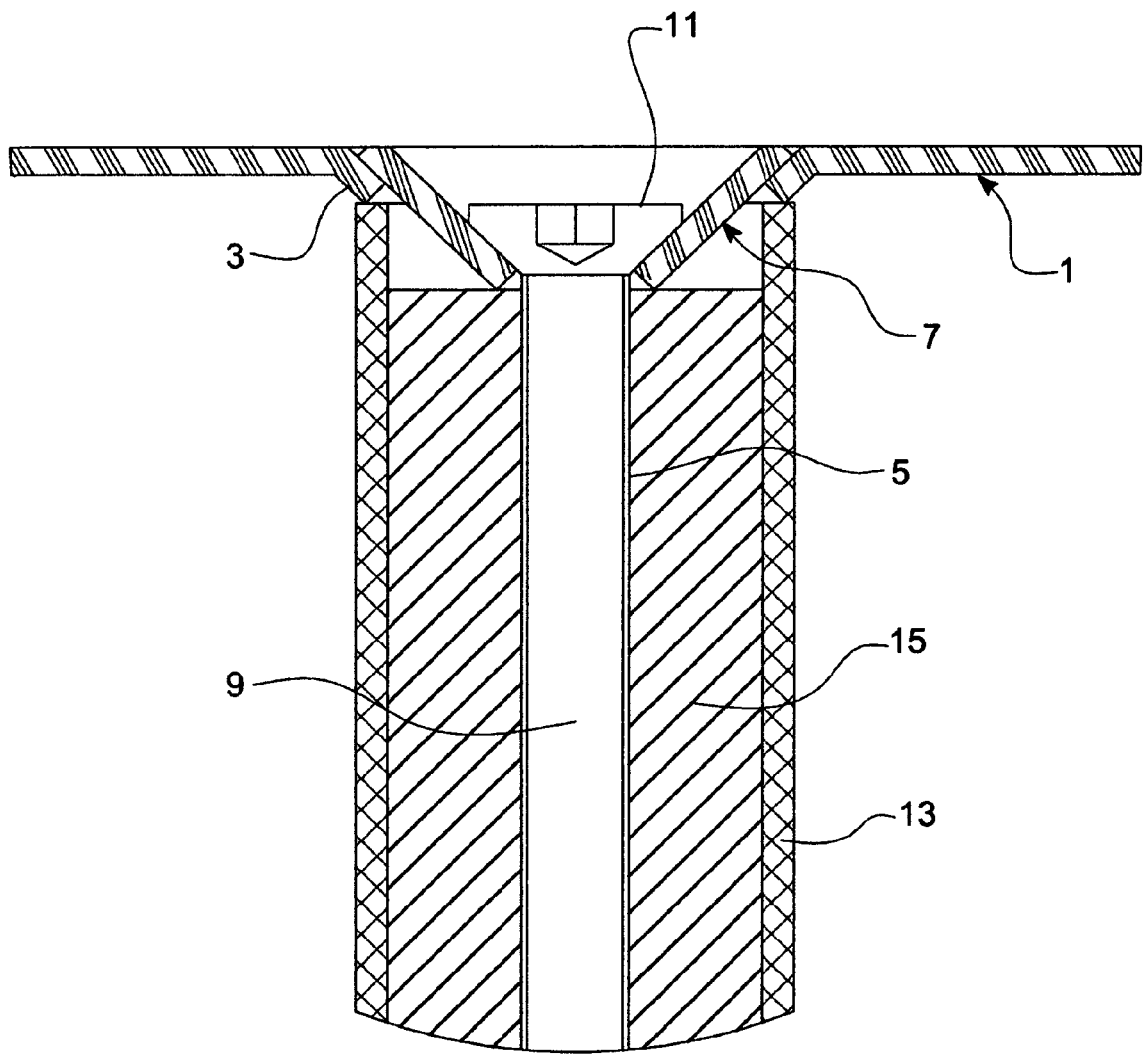

This invention relates to a fastening arrangement, for example for fastening a plate to a roof.

When fastening a plate, such as an anchor plate for a safety system, to a roof, toggle fastenings are generally inserted through the plate and the roof in order to engage with a remote surface of the roof so as to allow the toggle fastening to be tightened. One problem with such toggle fastenings, when used in combination with the anchor plate, is that the toggles have to be removed from the threaded fastening, in order to allow the threaded fastening to be passed through an opening in the plate, before being re-applied to the fastening for passing through the roof and fastening the anchor plate to the roof. This can be very awkward and time-consuming for installers and can lead to parts of the fastenings being lost or even damage to part of the roof.

It is therefore an object of the present invention to provide a fastening arrangement which overcomes, or at least ameliorates, the abovementioned disadvantages.

According to the present invention there is provided a fastening arrangement comprising: a threaded fastener including a head, a shank and a laterally expandable member; and a bridging member provided on the shank of the fastener, the bridging member having an aperture through which the shank passes, the aperture having a dimension greater than the dimension of the shank but less than the dimension of the head, and an outer dimension greater than a dimension of the laterally expandable member in a first configuration but less than the dimension of the laterally expandable member in a second configuration.

The laterally expandable member may comprise a toggle member.

The bridging member may be frustoconical or may be of top-hat configuration.

A seal may be provided between the head of the threaded fastener and the bridging member.

A tubular member may be mounted on the shank of the threaded fastener between the head and the laterally expandable member. The tubular member may be provided internally thereof with a hollow cylinder of insulating material.

The present invention also relates to a combination of a plate provided with at least one aperture and a fastening arrangement as hereinbefore defined passing through the aperture.

The aperture in the plate may have a smaller dimension than the outer dimension of the bridging member.

An edge region of the at least one aperture may be deformed out of a plane of the plate.

A seal, such as an O-ring seal, may be provided between the bridging member and the plate.

The plate and the at least one fastening arrangement may be provided with a protective cover layer.

For a better understanding of the present invention and to show more clearly how it may be carried into effect reference will now be made, by way of example, to the accompanying drawings in which:

FIG. 1 is a sectional view showing one embodiment of a fastening arrangement according to the present invention; and FIG. 2 is a cross-sectional view of another embodiment of a fastening arrangement according to the present invention.

The fastening arrangement shown in FIG. 1 comprises a plate 1, for example part of an anchor plate forming part of a safety installation. The plate 1 is formed with a substantially circular aperture, the edge 3 of the aperture being deformed out of the plane of the plate 1 in a direction of a roof to which the plate is to be secured. Alternatively, however, the plate 1 may be planar. The aperture is dimensioned to allow the passage of a fastener, such as a threaded member 5 provided with a toggle member or the like (not shown) in the region of the free end thereof. The threaded member passes through an insert (or bridging member) 7. The insert is substantially annular and has an outer dimension so as to engage with the material of the plate 1 around the aperture and an inner dimension so as to allow a shank 9 of the threaded member to pass through, but not a head 11 thereof. The head 11 is provided with means, such as a hexagonal recess, for engaging with means for rotating the threaded member so as to fasten the plate to the roof. The design of the head may be of standard design or may alternatively be of custom design. The insert 7 is conveniently frustonconical, extending in the direction of the roof, so as to accommodate the head of the threaded member and to allow a waterproofing membrane (not shown) to be positioned over the plate. Additionally, the configuration of the edge of the aperture and the insert is such that there is physical resistance to lateral movement which is preferable to relying solely on friction to maintain the insert in position relative to the plate. Alternatively, the insert may be of any suitable design, such as of top-hat design, although again physical resistance to lateral movement is preferable to relying solely on friction. A seal (not shown) may be provided between the head 11 of the threaded member 5 and the insert 7 and/or between the insert and the edge of the aperture if desired.

Thus, the insert 7 has a central aperture which is larger than the diameter of the shank of the threaded member in order to allow the shank to pass through the aperture, but less than the diameter of the head in order to maintain the insert on the threaded member. The outer dimension of the insert 7 is greater than a dimension of the toggle or the like when the toggle is configured to pass through the roof, but the outer dimension of the insert is less than a dimension of the toggle or the like when the toggle is deployed so as to be in a laterally expanded configuration relative to the axial direction of the threaded member in order to secure the fastening arrangement against an inner surface of the roof.

In practice, the threaded member 5 passes through a tubular member 13 which passes through the roof, the tubular member being made, for example, of a foamed plastics material or other suitable thermally insulating material. The tubular member 13 may have a hollow cylinder 15, for example of foamed plastics material (for example of lighter density than that of the tubular member 13), provided therein. The tubular member 13 helps to reduce the effects of a gap being made in insulating material forming part of the roof to allow the threaded member and the toggle or the like to pass through. The tubular member does not wholly eliminate heat conduction and convection, but it does offset the effects of thermal bridging resulting from the threaded member and toggle.

In use of the fastening arrangement, a fastening assembly comprising the insert 7 mounted on the threaded member 5 at a location remote from the installation site (together with a securing member for engaging an internal surface of the roof) with the threaded member and the securing member dimensioned to pass through the aperture in the plate 1, but the insert 7 being dimensioned to be retained by the plate. In this way the necessary holes can be formed through the roof and the tubular members can be inserted into the holes. The plate 1 can then be placed in position and the fastening assembly can be inserted into each of the apertures without an risk of losing parts of the fastening assembly and reducing the assembly time because there is no need to mount the securing member on the threaded member after the threaded member has been passed through the plate. Thus, the fastening assembly can be installed from a single side of the plate 1 and there is no requirement for access to the other side of the plate or to the inside surface of the roof. Alternatively, the tubular member may be provided as part of the fastening arrangement and can be inserted through the aperture in the plate at the time the plate is secured to the roof.

The fastening assembly may be of any convenient diameter and length, although in some cases the length of the assembly may be limited to prevent excessive protrusion of the fastening assembly on the inside surface of the roof.

As an alternative to a toggle fixing an alternative expandable securing member may be used, such as a laterally expandable member for securing in solid or hollow concrete.

The fastening arrangement shown in FIG. 2 is a modification of that of FIG. 1 and the same references are used to denote the same or similar components. FIG. 2 shows a metal plate 1 which is formed with a substantially circular aperture. In this case, though, the edge of the aperture is not deformed out of the plane of the plate. A threaded member 5 passes through the aperture and is provided with a toggle 17 threaded onto the free end thereof. The threaded member 5 passes through an insert 7 in the form of a top-hat component with a seal 19 between a head 11 of the threaded member and the insert 7. An O-ring seal 21 is positioned between the insert 7 and the plate 1. The plate 1, insert 7 and head 11 are covered with a protective layer 25, for example of PVC or bitumen.

Threaded member 5 passes through tubular member 13 as explained in relation to FIG. 1 and, as can be seen from FIG. 2, the toggle 17 (or alternative laterally expandable member) bears against an internal surface 23 of the roof.

The invention claimed is:

1. A combination of a plate provided with at least one aperture and a fastening arrangement comprising: a threaded fastener including a head, a shank and a laterally expandable member; a bridging member provided on the shank of the fastener, the bridging member having an outer dimension so as to engage with material of the plate around the aperture therein and an aperture through which the shank passes, the aperture through which the shank passes having a dimension greater than the dimension of the shank but less than the dimension of the head, and an outer dimension greater than a dimension of the laterally expandable member in a first configuration but less than the dimension of the laterally expandable member in a second configuration; and a tubular member mounted on the shank of the threaded member between the head and the laterally expandable member, characterised in that the tubular member is provided internally thereof with a hollow cylinder of insulating material.

2. A combination as claimed in claim 1, wherein the laterally expandable member comprises a toggle member.

3. A combination as claimed in claim 2, wherein the bridging member is frustoconical.

4. A combination as claimed in claim 2, wherein the bridging member is of top-hat configuration.

5. A combination as claimed in claim 2, wherein a seal is provided between the head of the threaded fastener and the bridging member.

6. A combination as claimed in claim 2, wherein the plate and the at least one fastening arrangement are provided with a protective cover layer.

7. A combination as claimed in claim 1, wherein the bridging member is frustoconical.

8. A combination as claimed in claim 7, wherein the aperture in the plate has a smaller dimension than the outer dimension of the bridging member.

9. A combination as claimed in claim 7, wherein an edge region of the at least one aperture is deformed out of a plane of the plate.

10. A combination as claimed in claim 7, wherein the plate and the at least one fastening arrangement are provided with a protective cover layer.

11. A combination as claimed in claim 1, wherein the bridging member is of top-hat configuration.

12. A combination as claimed in claim 11, wherein a seal is provided between the bridging member and the plate.

13. A combination as claimed in claim 12, wherein the seal comprises an O-ring seal.

14. A combination as claimed in claim 12, wherein the plate and the at least one fastening arrangement are provided with a protective cover layer.

15. A combination as claimed in claim 1, wherein a seal is provided between the head of the threaded fastener and the bridging member.

16. A combination as claimed in claim 1, wherein the aperture in the plate has a smaller dimension than the outer dimension of the bridging member.

17. A combination as claimed in claim 1, wherein an edge region of the at least one aperture is deformed out of a plane of the plate.

18. A combination as claimed in claim 1, wherein a seal is provided between the bridging member and the plate.

19. A combination as claimed in claim 18, wherein the seal comprises an O-ring seal.

20. A combination as claimed in claim 1, wherein the plate and the at least one fastening arrangement are provided with a protective cover layer.

\* \* \* \* \*